United States Patent
Minami et al.

(10) Patent No.: US 12,546,421 B2
(45) Date of Patent: Feb. 10, 2026

(54) HOSE WITH METAL FITTING

(71) Applicant: NICHIRIN CO., LTD., Hyogo (JP)

(72) Inventors: Atsuko Minami, Himeji (JP); Kazuhide Kishimoto, Himeji (JP)

(73) Assignee: NICHIRIN CO., LTD., Hyogo (JP)

( * ) Notice: Subject to any disclaimer, the term of this patent is extended or adjusted under 35 U.S.C. 154(b) by 0 days.

(21) Appl. No.: 18/996,281

(22) PCT Filed: Jul. 28, 2023

(86) PCT No.: PCT/JP2023/027869
§ 371 (c)(1),
(2) Date: Jan. 17, 2025

(87) PCT Pub. No.: WO2024/024974
PCT Pub. Date: Feb. 1, 2024

(65) Prior Publication Data
US 2025/0257828 A1    Aug. 14, 2025

(30) Foreign Application Priority Data
Jul. 29, 2022   (JP) .................. 2022-122162

(51) Int. Cl.
F16L 33/22    (2006.01)
F16L 11/12    (2006.01)
(Continued)

(52) U.S. Cl.
CPC ........... F16L 33/225 (2013.01); F16L 11/122 (2013.01); F16L 33/01 (2013.01); F16L 57/005 (2013.01)

(58) Field of Classification Search
CPC ...... F16L 33/225; F16L 11/122; F16L 11/086; F16L 33/01; F16L 33/207; F16L 33/20;
(Continued)

(56) References Cited

U.S. PATENT DOCUMENTS 2,700,988 A * 2/1955 Smisko
3,565,116 A * 2/1971 Gabin ................ F16L 33/24
(Continued)

FOREIGN PATENT DOCUMENTS

CA    3009423 A1    6/2017
CN    1719088 A    1/2006
(Continued)

OTHER PUBLICATIONS

Office Action issued in counterpart Japanese Patent Application No. 2022-122162 mailed on Jun. 6, 2023 (8 pages).
(Continued)

Primary Examiner — William S. Choi
(74) Attorney, Agent, or Firm — Osha Bergman Watanabe & Burton LLP

(57) ABSTRACT

A hose with a metal fitting includes a hose, a metal fitting connected to an end portion of the hose, and a sleeve covering at least a portion of the hose and metal fitting. The inside of the hose communicates with the inside of the metal fitting. The hose includes an inner-surface resin layer, a metal-wire reinforced layer, and an outer-surface resin layer. The sleeve includes a first cylindrical portion covering a portion of the metal fitting and a second cylindrical portion directly covering a portion of the hose. The length of the second cylindrical portion is 8 mm or more. The thickness of the second cylindrical portion is 1 mm or more. The hardness of the second cylindrical portion is measured in compliance with JISK6253 by Durometer Type A and is between 70 and 95. The material of the sleeve and the outer-surface resin layer are the same.

3 Claims, 4 Drawing Sheets

(51) Int. Cl.
*F16L 33/01* (2006.01)
*F16L 57/00* (2006.01)

(58) Field of Classification Search
CPC ....... F16L 33/2071; F16L 33/24; F16L 33/34; F16L 57/005; F16L 47/22
See application file for complete search history.

(56) References Cited

U.S. PATENT DOCUMENTS

| | | | | |
|---|---|---|---|---|
| 4,114,929 | A | * | 9/1978 | Knapp |
| 4,341,578 | A | * | 7/1982 | Chermak |
| 4,850,619 | A | * | 7/1989 | Lantos ................ F16L 33/01 |
| 5,090,745 | A | * | 2/1992 | Kluger |
| 6,938,932 | B2 | * | 9/2005 | Grepaly ............... F16L 33/01 |
| 11,761,563 | B2 | * | 9/2023 | Baldwin ............... F16L 33/01 |
| 2006/0006645 | A1 | | 1/2006 | Mukawa et al. |
| 2008/0302467 | A1 | | 12/2008 | Mukawa et al. |
| 2009/0126821 | A1 | * | 5/2009 | Domonkos ............ F16L 33/34 |
| 2015/0183970 | A1 | * | 7/2015 | Miyamoto |
| 2016/0312940 | A1 | * | 10/2016 | Melo ................ F16L 33/2071 |
| 2017/0211735 | A1 | | 7/2017 | Papafagos et al. |

FOREIGN PATENT DOCUMENTS

| | | |
|---|---|---|
| EP | 0655377 A2 | 5/1995 |
| EP | 1983246 A1 | 10/2008 |
| JP | S54-059518 U | 4/1979 |
| JP | 2007-333112 A | 12/2007 |
| JP | 2021-173401 A | 11/2021 |
| KR | 2016-0057252 A | 5/2016 |
| WO | 2017108173 A1 | 6/2017 |

OTHER PUBLICATIONS

Office Action issued in counterpart Japanese Patent Application No. 2022-122162 mailed on Feb. 28, 2023 (8 pages).
International Search Report issued in corresponding International Application No. PCT/JP2023/027869, mailed on Aug. 29, 2023 (5 pages).
Written Opinion issued in corresponding International Application No. PCT/JP2023/027869, mailed on Aug. 29, 2023 (4 pages).
International Preliminary Report on Patentability issued in Application No. PCT/JP2023/027869, mailed on Feb. 4, 2025 (5 pages).
Office Action issued in Chinese Patent Application No. 202380057342.4, mailed Jun. 21, 2025 (15 pages).
Extended European Search Report issued in counterpart European Application No. 23846704.7 mailed on Oct. 17, 2025 (9 pages).

* cited by examiner

HOSE WITH METAL FITTING

TECHNICAL FIELD

The present invention relates to a hose with a metal fitting that is a hose to which a metal fitting is connected.

BACKGROUND ART

A hose (e.g., a brake hose) used in a vehicle such as an automobile and a two-wheeled vehicle is a hose with a metal fitting structured by connecting a metal fitting to an end portion of a hose. Such a hose is required to have durability which can withstand vibration and bending in a vehicle.

Patent Literature 1 describes a brake hose with the above-described durability. The brake hose described in Patent Literature 1 includes a metal fitting provided at its end portion. The metal fitting includes a socket portion and a nipple portion which is concentrically formed inside the socket portion. Between the socket portion and the nipple portion, a hose is fitted. In the brake hose described in Patent Literature 1, in order to avoid stress from focusing on the leading end of the nipple portion and its surroundings in the case where the hose is bent, a leading end of the nipple portion protrudes as compared to that of the socket portion by 3 to 7 mm.

CITATION LIST

Patent Literatures

[Patent Literature 1] Japanese Laid-Open Patent Publication No. 2007-333112

SUMMARY OF THE INVENTION

Technical Problem

A metal fitting of the brake hose described in Patent Literature 1 is structurally different from other metal fittings. Being different from this, it is also required to provide, e.g., a durable hose without structurally changing a metal fitting of the hose.

An object of the present invention is to provide a durable hose with a metal fitting structured differently from a known hose with a metal fitting.

Solution to Problem

A hose with a metal fitting (this may be referred to as a metal-fitting-equipped hose) disclosed in the present specification comprises: a hose; a metal fitting including a metal-fitting cylindrical portion to which one end portion of the hose is connected; and a sleeve covering the hose and the metal-fitting cylindrical portion, the sleeve including: a first cylindrical portion covering the metal-fitting cylindrical portion; and a second cylindrical portion which covers the hose and which is smaller in diameter than the first cylindrical portion, the length of the second cylindrical portion being 8 mm or more, the thickness of the second cylindrical portion being 1 mm or more, and the hardness of the second cylindrical portion being measured in compliance with JISK6253 by Durometer Type A and being 70 or more and 95 or less.

When vibration occurs or the hose is bent, stress is likely to focus on a junction between the hose and the metal fitting and its surroundings so that a crack occurs at the hose in the vicinity of this junction. The occurrence of a crack at the hose is suppressed by covering the junction between the hose and the metal fitting and its surroundings with the sleeve.

The above-described arrangement makes it possible to provide a hose with durability, which is structured differently from a known hose.

Furthermore, a durable hose with a metal fitting can be provided while (i) the structure of the metal fitting is not changed and (ii) an actual-existing metal fitting is used. According to the above-described arrangement, for example, whip resistance required for a vehicle brake hose is provided.

In one embodiment of the hose with the metal fitting disclosed in the present specification, the second cylindrical portion may include: a cylindrical portion; and a leaning portion which is provided between the first cylindrical portion and the cylindrical portion and whose diameter becomes smaller toward the cylindrical portion.

According to this arrangement, because the leaning portion exists in an area on which the stress is the most likely to focus and which is in the vicinity of the junction between the metal-fitting cylindrical portion and the hose, the occurrence of a crack in the hose is further suppressed at the junction between the hose and the metal fitting and its surroundings. This improves the durability of the junction between the hose and the metal fitting and its surroundings, and thus the durability of the hose with the metal fitting is further improved.

In one embodiment of the hose with the metal fitting described above, the thickness of the leaning portion may be thicker than the thickness of the first cylindrical portion.

Because this arrangement increases the thickness of the leaning portion on which the stress is the most likely to focus, an effect of suppressing the occurrence of a crack at the hose in the vicinity of the junction between the hose and the metal fitting is improved. This improves the durability of the junction between the hose and the metal fitting and its surroundings, and thus the durability of the hose with the metal fitting is further improved.

In one embodiment of the hose with the metal fitting described above, the thickness of at least a part of the leaning portion may be thicker than the thickness of the cylindrical portion.

Because this arrangement increases the thickness of the leaning portion on which the stress is the most likely to focus, an effect of suppressing the occurrence of a crack at the hose in the vicinity of the junction between the hose and the metal fitting is improved. This improves the durability of the junction between the hose and the metal fitting and its surroundings, and thus the durability of the hose with the metal fitting is further improved.

In one embodiment of the hose with the metal fitting described above, the inside of the hose may be communicated with the inside of the metal fitting, the first cylindrical portion may directly cover the metal-fitting cylindrical portion, and the second cylindrical portion may directly cover the hose.

With this arrangement, fluid flows in an area where the inside of the hose is communicated with the inside of the metal fitting. With this arrangement, when (i) a crack occurs at the hose in the vicinity of the junction between the hose and the metal fitting and then (ii) the crack progresses, the fluid may leak out from the crack. Because (i) the first cylindrical portion of the sleeve directly covers the metal-fitting cylindrical portion of the metal fitting at the junction between the hose and the metal fitting and its surroundings and (ii) the second cylindrical portion of the sleeve directly covers the hose, the occurrence of a crack in the hose is suppressed at the junction between the hose and the metal fitting and its surroundings. Therefore, the fluid does not leak out.

In one embodiment of the hose with the metal fitting described above, a material of the sleeve may be thermoplastic elastomer or rubber.

Even when the material of the sleeve is an easily available material such as the thermoplastic elastomer or rubber, the durability of the hose with the metal fitting is improved.

In one embodiment of the hose with the metal fitting described above, the hose may include an inner-surface resin layer, a metal-wire reinforced layer, and an outer-surface resin layer lined up in order from the inner side of the hose.

According to this arrangement, because (i) the inner-surface resin layer which is hard to corrode with the fluid passing through the hose is formed as the innermost layer and (ii) the metal-wire reinforced layer is formed outside the inner-surface resin layer, expansion of the hose is suppressed even in the case where the internal pressure of the fluid is applied. Furthermore, because the outer-surface resin layer is formed outside the metal-wire reinforced layer to protect it, the damage from the outside of the metal-wire reinforced layer is suppressed.

In one embodiment of the hose with the metal fitting described above, (i) the hose may include an inner-surface resin layer, a metal-wire reinforced layer, and an outer-surface resin layer lined up in order from the inner side of the hose and (ii) the inner-surface resin layer may be formed of a single layer containing fluororesin.

The inner-surface resin layer of the hose is formed of a single layer containing the fluororesin so as to improve heat resistance of the hose. Meanwhile, when the hose includes the inner-surface resin layer, the metal-wire reinforced layer, and the outer-surface resin layer lined up in order from the inner side of the hose, the inner-surface resin layer, the metal-wire reinforced layer, and the outer-surface resin layer are typically adhered with an adhesive. When the inner-surface resin layer is formed of a single layer containing the fluororesin, (i) the adhesive is not adhered to the fluororesin and thus (ii) the adhesion of the inner-surface resin layer to the metal-wire reinforced layer is weak. Therefore, when vibration occurs or the hose is bent, the inner-surface resin layer may be deviated from the metal-wire reinforced layer so that a crack is likely to occur in the metal-wire reinforced layer and the outer-surface resin layer. As a result, sufficient durability may not be obtained. Even when the inner-surface resin layer of the hose is formed of a single layer containing the fluororesin, the occurrence of a crack at the hose in an environment where vibration occurs or the hose is bent is suppressed by covering the junction between the hose and the metal fitting and its surroundings with the sleeve. To be more specific, this makes it possible to provide a hose with a metal fitting with the durability and high heat resistance required for a two-wheeled vehicle brake hose, etc.

In one embodiment of the hose with the metal fitting described above, (i) the hose may include an inner-surface resin layer, a metal-wire reinforced layer, and an outer-surface resin layer lined up in order from the inner side of the hose and (ii) the material of the sleeve may be the same as a material of the outer-surface resin layer.

When the material of the sleeve is the same as that of the outer-surface resin layer, physical properties of these materials are the same so that the occurrence of stress due to the difference in physical property is suppressed. As a result, the occurrence of a crack is further suppressed in the hose with the metal fitting so as to further improve the durability.

In one embodiment of the hose with the metal fitting described above, (i) the hose may include an inner-surface resin layer, a metal-wire reinforced layer, and an outer-surface resin layer lined up in order from the inner side of the hose, (ii) the material of the sleeve may be the same as a material of the outer-surface resin layer, and (iii) the material of the sleeve and the material of the outer-surface resin layer may be the thermoplastic elastomer or the rubber.

The following effects are provided in addition to the above-described effects.

While an easily available material is used for the sleeve and the outer-surface resin layer, (i) the occurrence of a crack is further suppressed in the hose with the metal fitting and (ii) the durability is further improved.

Advantageous Effects of Invention

A durable hose with a metal fitting structured differently from a known hose with a metal fitting is provided.

PREFERRED EMBODIMENT OF INVENTION

The following will describe a preferred embodiment of the present invention.

Figure 1:
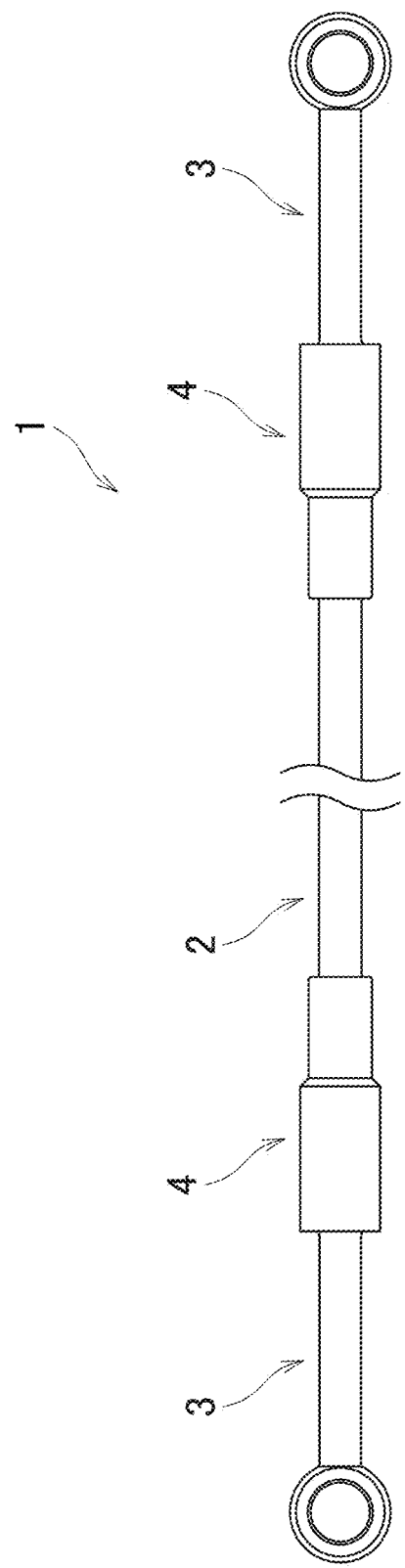
FIG. 1 is an external view of a metal-fitting-equipped hose (this is equivalent to the hose with the metal fitting described above) according to an embodiment.

FIG. 1 shows a metal-fitting-equipped hose 1 (this is equivalent to the hose with the metal fitting described above). The metal-fitting-equipped hose 1 includes a hose 2, metal fittings 3, and sleeves 4. The metal fittings 3 are connected to both end portions of the hose 2. The hose 2 is communicated with the metal fittings 3 (see FIG. 4 described later). A junction between the hose 2 and each metal fitting 3 and its surroundings are covered by a sleeve 4 (see FIG. 3 described later). The metal-fitting-equipped hose 1 is used as, e.g., a brake hose of a vehicle. Fluid flows in an area where the hose 2 is communicated with the metal fitting 3.

The hose 2 includes plural layers lined up in order from the inner side of the hose 2. The hose 2 shown in FIG. 2 includes an inner-surface resin layer 21, a metal-wire reinforced layer 22, and an outer-surface resin layer 23 which are lined up in order from the inner side of the hose 2.

The innermost layer of the hose 2 may be formed of a single layer containing fluororesin. The hose 2 may include plural layers lined up in order from the inner side of the hose 2. In this case, the innermost layer of the hose 2 may be a layer containing fluororesin.

Figure 2:
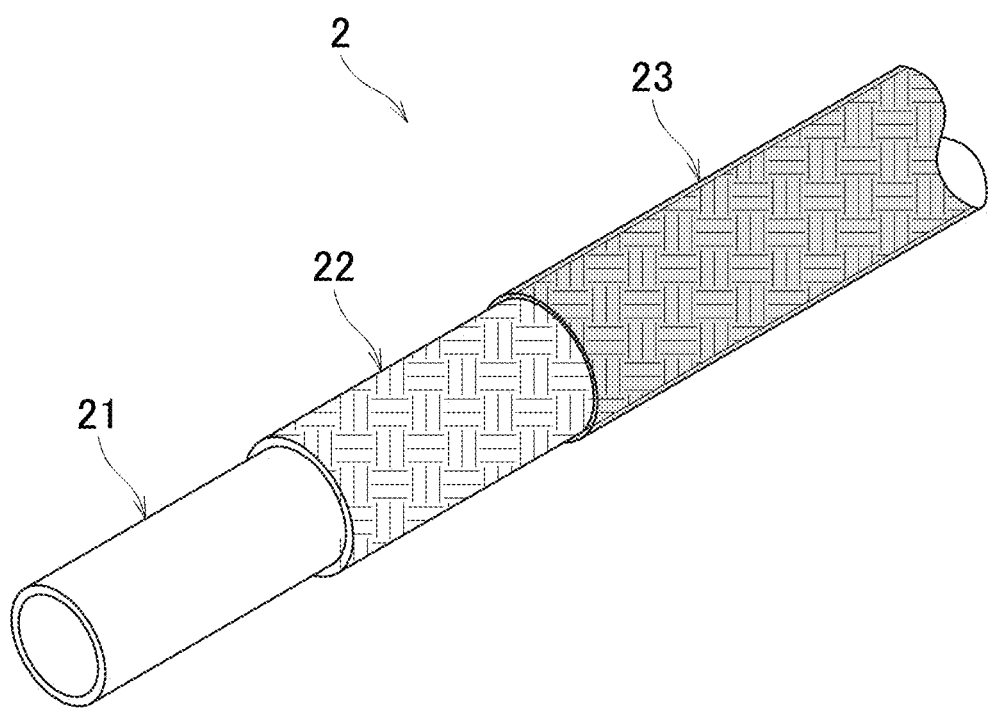
FIG. 2 is an external view of a hose, showing the structure of the hose.

In the hose 2 shown in FIG. 2, for example, the inner-surface resin layer 21 may be formed of a single layer containing fluororesin. Examples of fluororesin include at least one type selected from a group formed of polytetrafluoroethylene (PTFE), perfluoroalkoxy alkane (PFA), and tetrafluoride ethylene copolymer (FEP). One type selected from this group may be used, or two or more types selected from this group may be blended and used. In these cases, the inner-surface resin layer 21 may contain a component which is not fluororesin. In the hose 2 shown in FIG. 2, for another example, the inner-surface resin layer 21 may be formed of plural layers. For example, the inner-surface resin layer 21 may be formed of three layers which are an inner surface, an intermediate surface, and an outer surface which are lined up in order from the inner side of the hose 2. In this case, the inner layer may be a layer containing fluororesin (ethylene-tetrafluoroethylene copolymer (ETFE), etc.), the intermediate layer may be a layer containing adhesive polyamide resin (polyamide 12 (PA12), etc.), and the outer layer may be a gas-barrier layer containing polyamide resin (polyamide 11 (PA11), etc.)

The metal-wire reinforced layer 22 is a layer formed by braiding metal wires (thin metal wires). For example, stainless steel (SUS) wires are used as the metal wires.

The outer-surface resin layer 23 is a resin layer. Examples of resin include thermoplastic polyurethane (TPU) and polyamide resin (PA). The resin may be, e.g., thermoplastic elastomer or rubber. The thermoplastic elastomer is not particularly limited. Examples of thermoplastic elastomer include olefin elastomer, styrene elastomer, chloroethylene elastomer, urethane elastomer, ester elastomer, amide elastomer, etc. Each of these elastomers may be independently used, or two or more of these elastomers may be blended and used. The rubber is not particularly limited, but examples of rubber include diene rubber, olefin rubber, acrylic rubber (ACM, ANM), butyl rubber (IIR), urethane rubber (U), silicone rubber (Q), fluororubber (FFKM, FKM), etc. Each of these rubber components may be independently used, or two or more of these rubber components may be blended and used.

Figure 3:
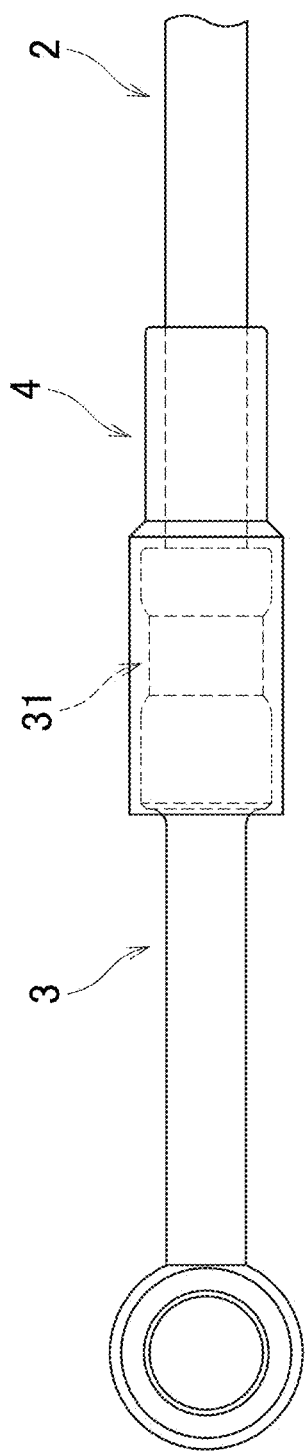
FIG. 3 shows the internal structure of one end portion of the metal-fitting-equipped hose.

FIG. 3 shows the internal structure of the sleeve 4 by dashed lines. The metal fitting 3 has a metal-fitting cylindrical portion 31 at its end portion. An end portion of the hose 2 is fitted into the metal-fitting cylindrical portion 31 so that the hose 2 is connected to the metal fitting 3. In the present embodiment, a so-called eye joint is illustrated as the metal fitting 3. However, a different metal fitting may be used.

The metal-fitting cylindrical portion 31 and the hose 2 are covered by the sleeve 4. The sleeve 4 directly covers the metal-fitting cylindrical portion 31 and the hose 2. To be more specific, a junction between the metal-fitting cylindrical portion 31 and the hose 2 and its surroundings are covered by the sleeve 4. The entire metal-fitting cylindrical portion 31 may be covered by the sleeve 4, or a part of the metal-fitting cylindrical portion 31 may be covered by the sleeve 4. In regard to the hose 2, at least a part of the hose 2 may be covered by the sleeve 4.

Figure 4:
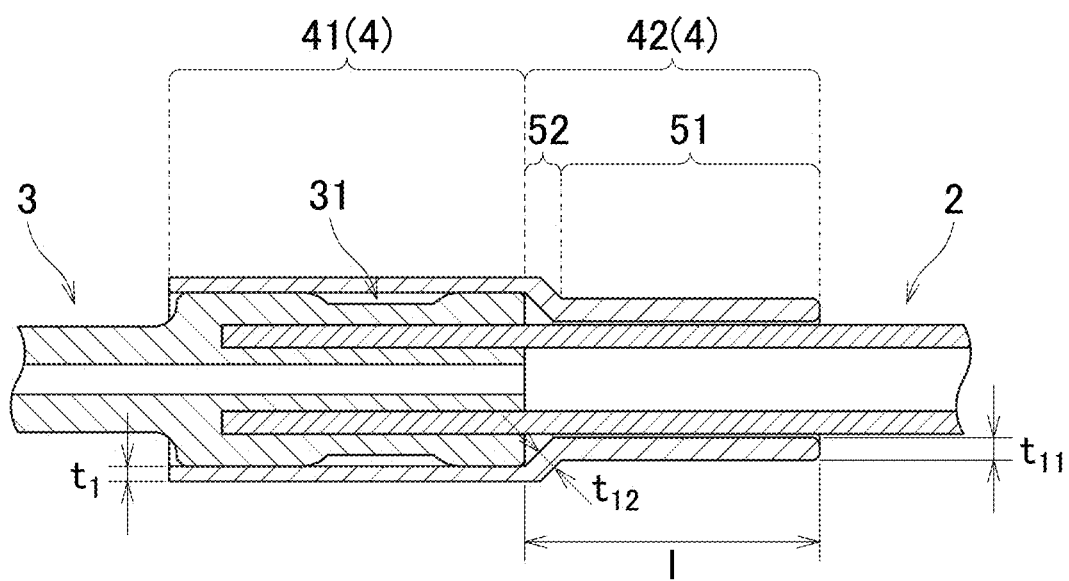
FIG. 4 is a cross section of a junction between the hose and a metal fitting and its surroundings.

FIG. 4 shows a partial cross section of the junction between the hose 2 and the metal fitting 3 and its surroundings. The sleeve 4 includes a first cylindrical portion 41 covering the metal-fitting cylindrical portion 31 and a second cylindrical portion 42 covering the hose 2. The first cylindrical portion 41 directly covers the metal-fitting cylindrical portion 31. The first cylindrical portion 41 is a portion mainly for holding the sleeve 4 on the metal-fitting cylindrical portion 31. The second cylindrical portion 42 directly covers the hose 2. The diameter of the second cylindrical portion 42 is smaller than that of the first cylindrical portion 41. In this regard, when the "diameter of the second cylindrical portion 42 is smaller than that of the first cylindrical portion 41", the second cylindrical portion 42 have any one of the following parts: (1) a part whose inner diameter is smaller than the inner diameter of the first cylindrical portion 41; (2) a part whose outer diameter is smaller than the outer diameter of the first cylindrical portion 41; and (3) a part whose inner diameter is smaller than the inner diameter of the first cylindrical portion 41 and whose outer diameter is partially smaller than the outer diameter of the first cylindrical portion 41.

The second cylindrical portion 42 includes a cylindrical portion 51 and a leaning portion 52. The cylindrical portion 51 is cylindrical in shape, and each of the inner diameter and outer diameter of the cylindrical portion 51 is substantially constant. The leaning portion 52 is formed between the first cylindrical portion 41 and the cylindrical portion 51. The leaning portion 52 is a portion whose diameter becomes smaller toward the cylindrical portion 51. In this regard, when the "diameter becomes smaller toward the cylindrical portion 51", the inner diameter and/or outer diameter become/becomes smaller toward the cylindrical portion 51.

The length 1 ("l" shown in FIG. 4) of the second cylindrical portion 42 is 8 mm or more. When the sleeve 4 covers the hose 2 and the metal-fitting cylindrical portion 31 (see FIG. 4), (i) a part of the hose 2 is not fitted into the metal-fitting cylindrical portion 31 and (ii) this part of the hose 2 is covered by the sleeve 4 by 8 mm or more from a leading end of the metal-fitting cylindrical portion 31. The upper limit of the length 1 of the second cylindrical portion 42 is not particularly limited. For example, the upper limit of the length 1 of the second cylindrical portion 42 is presumably adjusted so as not to overlap an unillustrated bush fixing the metal-fitting-equipped hose 1 to a vehicle, etc. or so as not to overlap a sleeve 4 covering the hose 2 and a metal fitting 3 provided at the other end portion of the metal-fitting-equipped hose 1. In consideration of this, for example, the length 1 of the second cylindrical portion 42 may be 50 mm or less. The upper limit of the length 1 of the second cylindrical portion 42 does not affect an effect of durability described later.

The thickness ("t11" shown in FIG. 4) of the second cylindrical portion 42 is 1 mm or more. The upper limit of the thickness of the second cylindrical portion 42 is not particularly limited. The upper limit of the thickness of the second cylindrical portion 42 does not affect the effect of durability described later. For example, the thickness of the second cylindrical portion 42 may be 5 mm or less in consideration of installation space of the metal-fitting-equipped hose 1.

The thickness ("t11", "t12" shown in FIG. 4) of the second cylindrical portion 42 may be or may not be entirely the same. For example, the thickness t12 of the leaning portion 52 may be the same as the thickness t11 of the cylindrical portion 51, or the thickness t12 of at least a part of the leaning portion 52 may be different from the thickness t11 of the cylindrical portion 51. For example, the thickness t12 of at least a part of the leaning portion 52 may be thicker than the thickness t11 of the cylindrical portion 51.

The thickness ("t11", "t12" shown in FIG. 4) of the second cylindrical portion 42 may be the same as or different from the thickness t1 of the first cylindrical portion 41. For example, the thickness of the second cylindrical portion 42 may be thicker than the thickness t1 of the first cylindrical portion 41. The thickness t12 of the leaning portion 52 of the second cylindrical portion 42 may be thicker than the thickness t1 of the first cylindrical portion 41.

The hardness of the second cylindrical portion 42 is measured in compliance with JISK6253 by Durometer Type A, and is 70 or more and 95 or less. The hardness of the second cylindrical portion 42 may be the same as or different from that of the first cylindrical portion 41.

The length, thickness, and hardness of the first cylindrical portion 41 are not particularly limited. The length, thickness, and hardness of the first cylindrical portion 41 do not affect the later-described durability.

A material of the sleeve 4 is resin. The resin is not particularly limited. For example, the resin may be thermoplastic elastomer or rubber. The thermoplastic elastomer is not particularly limited. Examples of thermoplastic elastomer include olefin elastomer, styrene elastomer, chloroethylene elastomer, urethane elastomer, ester elastomer, amide elastomer, etc. Each of these elastomers may be independently used, or two or more of these elastomers may be blended and used. The rubber is not particularly limited, but examples of rubber include diene rubber, olefin rubber, acrylic rubber (ACM, ANM), butyl rubber (IIR), urethane rubber (U), silicone rubber (Q), fluororubber (FFKM, FKM), etc. Each of these rubber components may be independently used, or two or more of these rubber components may be blended and used. For example, the resin may be thermoplastic polyurethane (TPU) or polyamide resin (PA).

When the hose 2 includes plural layers lined up in order from the inner side of the hose 2, a material of the sleeve 7 may be the same as that of the outermost layer of the hose 2. When the hose 2 is structured as shown in FIG. 2, the material of the sleeve 7 may be the same as that of the outer-surface resin layer 23 of the hose 2.

For example, the sleeve 4 covers the junction between the hose 2 and the metal-fitting cylindrical portion 31 and its surroundings while the hose 2 is connected to the metal-fitting cylindrical portion 31. For example, the sleeve 4 may be adhered to the metal-fitting cylindrical portion 31 with an adhesive, etc., may be fixed to the metal-fitting cylindrical portion 31 with a band, or may just cover the metal-fitting cylindrical portion 31. Even when vibration occurs or a hose is bent, the sleeve 4 preferably keeps covering the metal-fitting cylindrical portion 31 and the hose 2. The inner diameter of the sleeve 4 may not be substantially the same as the outer diameter of the hose 2 as long as the sleeve 4 keeps covering the metal-fitting cylindrical portion 31 and the hose 2. The inner diameter of the sleeve 4 may not be substantially the same as the outer diameter of the metal-fitting cylindrical portion 31 as long as the sleeve 4 keeps covering the metal-fitting cylindrical portion 31 and the hose 2.

The above-described present embodiment provides the following effects.

In a metal-fitting-equipped hose without the sleeve 4, when vibration occurs or the hose 2 is bent, the stress is likely to focus on the junction between the hose 2 and the metal-fitting cylindrical portion 31 and its surroundings so that a crack occurs at the hose 2 in the vicinity of this junction. In the present embodiment, because the sleeve 4 structured as described above covers the junction between the hose 2 and the metal-fitting cylindrical portion 31 and its surroundings, the occurrence of a crack in the hose 2 is suppressed even in an environment where the vibration occurs or the hose 2 is bent. In the present embodiment, the metal-fitting-equipped hose 1 with the durability is provided while (i) the structures of metal fittings are not different and (ii) actual-existing metal fittings are used. To be more specific, as described later, the metal-fitting equipped hose 1 has whip resistance required for a vehicle brake hose.

As shown in FIG. 4, the leaning portion 52 whose diameter becomes smaller is formed at the sleeve 4. Because the leaning portion 52 exists in an area on which the stress is the most likely to focus and which is in the vicinity of the junction between the metal-fitting cylindrical portion 31 and the hose 2, the occurrence of a crack in the hose 2 is further suppressed at the junction between the hose 2 and the metal fitting 3 and its surroundings. This improves the durability of the junction between the hose 2 and the metal fitting 3 and its surroundings, and thus the durability of the metal-fitting-equipped hose 1 is further improved.

An effect of suppressing the occurrence of a crack at the hose 2 in the vicinity of the junction between the hose 2 and the metal fitting 3 is improved by arranging the thickness t12 of the leaning portion 52 on which the stress is the most likely to focus to be thick. Therefore, the thickness t12 of the leaning portion 52 may be thicker than the thickness of other portions of the sleeve 4. For example, the durability is further improved by arranging the thickness t12 of the leaning portion 52 to be thicker than the thickness t1 of the first cylindrical portion 41. The durability is further improved by arranging the thickness t12 of at least a part of the leaning portion 52 to be thicker than the thickness t11 of the cylindrical portion 51.

The inside of the hose 2 is communicated with the inside of the metal fitting 3. The fluid flows in an area where the inside of the hose 2 is communicated with the inside of the metal fitting 3. With this arrangement, when (i) a crack occurs at the hose 2 in the vicinity of the junction between the hose 2 and the metal fitting 3 and then (ii) the crack progresses, the fluid may leak out from the crack. However, because (i) the first cylindrical portion 41 of the sleeve 4 directly covers the metal-fitting cylindrical portion 31 of the metal fitting 3 at the junction between the hose 2 and the metal fitting 3 and its surroundings and (ii) the second cylindrical portion 42 of the sleeve 4 directly covers the hose 2, the occurrence of a crack in the hose 2 is suppressed at the junction between the hose 2 and the metal fitting 3 and its surroundings. Therefore, the fluid does not leak out.

The material of the sleeve 4 is not particularly limited. However, for example, the durability of the metal-fitting-equipped hose 1 is improved by using an easily available material such as thermoplastic elastomer and rubber.

The structure of the hose 2 is not particularly limited, but the hose 2 may include plural layers lined up in order from the inner side of the hose 2. When the hose 2 includes plural layers lined up in order from the inner side of the hose 2, the employment of a material which is hard to corrode for the innermost layer in contact with the fluid, the employment of a material which is hard to get damaged for the outermost layer, the arrangement of the outermost layer to be hard to get damaged, and/or the addition of a layer whose material improves the strength of a hose or which is structured to improve the strength of the hose may be done. When the hose 2 includes the inner-surface resin layer 21, the metal-wire reinforced layer 22, and the outer-surface resin layer 23 lined up in order from the inner side of the hose 2 as shown in FIG. 2, the following effects are provided. Because (i) the inner-surface resin layer 21 which is hard to corrode with the fluid passing through the hose 2 is formed as the innermost layer and (ii) the metal-wire reinforced layer 22 is formed outside the inner-surface resin layer 21, expansion of the hose 2 is suppressed even in the case where the internal pressure of the fluid is added. Because the outer-surface resin layer 23 is formed outside the metal-wire reinforced layer 22 to protect it, the damage from the outside of the metal-wire reinforced layer 22 is suppressed. The hose 2 may be formed of a single layer.

In a two-wheeled vehicle brake hose, the improvement in heat resistance is recently required. When the hose 2 includes plural layers lined up in order from the inner side of the hose 2, the innermost layer of the hose 2 is formed of a single layer containing fluororesin (e.g., PTFE) so as to improve the heat resistance of the hose 2.

When the hose 2 is structured as shown in FIG. 2, the inner-surface resin layer 21 (see FIG. 2) of the hose 2 is formed of a single layer containing fluororesin (e.g., PTFE) so as to improve the heat resistance of the hose 2. Meanwhile, when the inner-surface resin layer 21 is formed of a single layer containing fluororesin (e.g., PTFE) even though the inner-surface resin layer 21, the metal-wire reinforced layer 22, and the outer-surface resin layer 23 are typically adhered with an adhesive, (i) the adhesive is not adhered to the fluororesin and thus (ii) the adhesion of the inner-surface resin layer 21 to the metal-wire reinforced layer 22 is weak. Therefore, when vibration occurs or the hose 2 is bent, the inner-surface resin layer 21 may be deviated from the metal-wire reinforced layer 22 so that a crack is likely to occur in the metal-wire reinforced layer 22 and the outer-surface resin layer 23. As a result, sufficient durability may not be obtained.

Even when the inner-surface resin layer 21 of the hose 2 is formed of a single layer containing fluororesin (e.g., PTFE), the occurrence of a crack at the hose 2 in an environment where vibration occurs or the hose 2 is bent is suppressed by covering the junction between the hose 2 and the metal-fitting cylindrical portion 31 and its surroundings with the sleeve 4 (see FIG. 4) as described above. To be more specific, as described later, the metal-fitting equipped hose 1 has the whip resistance required for a vehicle brake hose. It is therefore possible to provide the metal-fitting-equipped hose 1 with durability and high heat resistance required for a two-wheeled vehicle brake hose, etc.

When (i) the hose 2 includes plural layers lined up in order from the inner side of the hose 2 and (ii) the material of the sleeve 4 is the same as that of the outermost layer of the hose 2, physical properties of these materials are the same so that the occurrence of stress due to the difference in physical property is suppressed. As a result, the occurrence of a crack is further suppressed in the metal-fitting-equipped hose 1 so as to further improve the durability. When (i) the material of the sleeve 4 is the same as that of the outermost layer of the hose 2 and (ii) the material of the sleeve 4 and that of the outermost layer of the hose 2 are thermoplastic elastomer or rubber, the occurrence of a crack in the metal-fitting-equipped hose 1 is further suppressed with an easily available material. As a result, the durability is further improved.

When (i) the hose 2 is structured as shown in FIG. 2 and (ii) the material of the sleeve 4 is the same as that of the outer-surface resin layer 23 of the hose 2, physical properties of these materials are the same so that the occurrence of stress due to the difference in physical property is suppressed. As a result, the occurrence of a crack is further suppressed in the metal-fitting-equipped hose 1 so as to further improve the durability. When (i) the hose 2 is structured as shown in FIG. 2, (ii) the material of the sleeve 4 is the same as that of the outer-surface resin layer 23 of the hose 2, and (iii) the material of the sleeve 4 and that of the outer-surface resin layer 23 of the hose 2 are thermoplastic elastomer or rubber, the occurrence of a crack in the metal-fitting-equipped hose 1 is further suppressed with an easily available material. As a result, the durability is further improved.

EXAMPLES

The following will further detail the present invention with reference to Examples. However, Examples described below do not limit the present invention.

Experiment 1

The experiment (whip testing) for checking durability was conducted by using a metal-fitting-equipped hose which was structured similarly as shown in FIG. 1 to FIG. 4.

A hose which was used includes an inner-surface resin layer, a metal-wire reinforced layer, and an outer-surface resin layer lined up in order from the inner side of the hose. The inner-surface resin layer is formed of a polytetrafluoroethylene (PTFE) single layer, the metal-wire reinforced layer is a stainless (SUS) wire reinforced (braided) layer, and the outer-surface resin layer is a thermoplastic polyurethane (TPU) layer.

A sleeve which was used is made of thermoplastic polyurethane (TPU). The thickness of the used sleeve is 1 mm. The hardness of the used sleeve is measured as 70 (70A) in compliance with JISK6253 by Durometer Type A.

As shown in Table 1, four types of metal-fitting-equipped hoses with different lengths (see "l" shown in FIG. 4) of second cylindrical portions of sleeves were prepared. The whip testing was conducted for each metal-fitting-equipped hose in compliance with JIS D 2601. Table 1 shows the time for each hose to burst.

TABLE 1

| | LENGTH OF SECOND CYLINDRICAL PORTION OF SLEEVE | | | |
|---|---|---|---|---|
| | 5 mm | 8 mm | 10 mm | 15 mm |
| TIME FOR HOSE TO BURST | 15~20 hr | 40~45 hr | 50 hr OR MORE | 50 hr OR MORE |
| STANDARD | | 35 hr OR MORE | | |

JIS D 2601 in the Japanese Industrial Standards defines whipability in the whip testing so that a vehicle brake hose should take 35 hr or more to burst in the whip testing. According to Table 1, the time taken by a hose burst is 35 hr (35 hours) or more in the case where the length of the second cylindrical portion of the sleeve is 8 mm or more.

Experiment 2

Four types of metal-fitting-equipped hoses were prepared so that (i) the length of the second cylindrical portion of the sleeve was 8 mm and (ii) the thickness of the second cylindrical portion of the sleeve was adjusted as shown in Table 2. The whip testing was conducted while other conditions were the same as in Experiment 1.

TABLE 2

| | THICKNESS OF SECOND CYLINDRICAL PORTION OF SLEEVE | | | |
|---|---|---|---|---|
| | 0.5 mm | 0.8 mm | 1.0 mm | 1.5 mm |
| TIME FOR HOSE TO BURST | 10~15 hr | 25~30 hr | 40~45 hr | 50 hr OR MORE |
| STANDARD | | 35 hr OR MORE | | |

According to Table 2, the time taken by the hose burst is 35 hr (35 hours) or more in the case where the thickness of the second cylindrical portion of the sleeve is 1 mm or more.

Experiment 3

Five types of metal-fitting-equipped hoses were prepared so that (i) the length of the second cylindrical portion of each sleeve was 8 mm and (ii) the hardness of the second cylindrical portion of each sleeve was adjusted as shown in Table 3. The whip testing was conducted while other conditions were the same as in Experiment 1.

TABLE 3

| | HARDNESS OF SECOND CYLINDRICAL PORTION OF SLEEVE | | | | |
|---|---|---|---|---|---|
| | 60A | 70A | 75A | 85A | 95A |
| TIME FOR HOSE TO BURST | 15~20 hr | 40~45 hr | 45~50 hr | 50 hr OR MORE | 50 hr OR MORE |
| STANDARD | | | 35 hr OR MORE | | |

The "60A", "70A", "75A", "85A", and "95A" shown in Table 3 show the followings.
- 60A: The hardness measured in compliance with JISK6253 by Durometer type A is 60.
- 70A: The hardness measured in compliance with JISK6253 by Durometer type A is 70.
- 75A: The hardness measured in compliance with JISK6253 by Durometer type A is 75.
- 85A: The hardness measured in compliance with JISK6253 by Durometer type A is 85.
- 95A: The hardness measured in compliance with JISK6253 by Durometer type A is 95.

According to Table 3, the time taken by the hose burst is 35 hr (35 hours) or more in the case where the hardness of the second cylindrical portion of the sleeve is 70 or more and 95 or less. In this regard, the hardness of the second cylindrical portion of the sleeve is measured in compliance with JISK6253 by Durometer Type A.

According to the above-described Experiments 1 to 3, a metal-fitting-equipped hose with the durability defined in JIS D 2601 is obtained by using a sleeve in which the length of the second cylindrical portion is 8 mm or more, in which the thickness of the second cylindrical portion is 1 mm or more, and in which the hardness of the second cylindrical portion is 70 or more and 95 or less. In this regard, the hardness of the second cylindrical portion is measured in compliance with JIS D 2601 by Durometer Type A.

In the above-described Experiments 1 to 3, because PTFE is used as the inner-surface resin layer of the hose, the inner-surface resin layer is likely to be deviated from the metal-wire reinforced layer provided outside the inner-surface resin layer. Even when such a hose is used, the metal-fitting-equipped hose with the durability defined in JIS D 2601 is obtained by using the above-described sleeve.

Thus, the embodiment of the present invention is described hereinabove. However, the specific structure of the present invention shall not be interpreted as to be limited to the above-described embodiment. Accordingly, the preferred embodiments of the present invention as set forth above are intended to be illustrative, not limiting. Various changes may be made without departing from the spirit and scope of the invention as defined in the following claims.

For example, the structure of the hose is not limited to a three-layer structure formed of the inner-surface resin layer 21, the metal-wire reinforced layer 22, and the outer-surface resin layer 23 shown in FIG. 2, and can be changed differently. The structure of the inner-surface resin layer 21 also can be changed.

In the sleeve, as shown in FIG. 4, the leaning portion 52 may exist between the first cylindrical portion 41 and the cylindrical portion 51, or the first cylindrical portion 41 and the cylindrical portion 51 may be continuously provided without the leaning portion 52.

REFERENCE SIGNS LIST 1 metal-fitting-equipped hose
2 hose
21 inner-surface resin layer
22 metal-wire reinforced layer
23 outer-surface resin layer
3 metal fitting
4 sleeve
41 first cylindrical portion
42 second cylindrical portion
51 cylindrical portion
52 leaning portion

The invention claimed is:
1. A hose with a metal fitting, comprising:
a hose;
the metal fitting including a metal-fitting cylindrical portion to which one end portion of the hose is connected; and
a sleeve covering the hose and the metal-fitting cylindrical portion,
an inside of the hose being communicated with an inside of the metal fitting,
the hose including an inner-surface resin layer, a metal-wire reinforced layer, and an outer-surface resin layer which are lined up in order from an inner side of the hose,
the inner-surface resin layer being formed of a single layer containing fluororesin,
the sleeve including:
  a first cylindrical portion covering the metal-fitting cylindrical portion and terminating at the end portion connected to the hose; and
  a second cylindrical portion which directly and only covers the hose and which is smaller in diameter than the first cylindrical portion, wherein:
    a length of the second cylindrical portion being 8 mm or more,
    a thickness of the second cylindrical portion being 1 mm or more,
    a hardness of the second cylindrical portion being measured in compliance with JISK6253 by Durometer Type A and being 70 or more and 95 or less,
    the second cylindrical portion includes a cylindrical portion and a leaning portion, the leaning portion provided between the first cylindrical portion and the cylindrical portion of the second cylindrical portion,
    a diameter of the leaning portion is larger near the first cylindrical portion than near the cylindrical portion of the second cylindrical portion, and
    a thickness of the leaning portion is thicker than a thickness of the first cylindrical portion, a material of the sleeve being thermoplastic elastomer or rubber, and the material of the sleeve being the same as a material of the outer-surface resin layer.

2. The hose with the metal fitting according to claim 1, wherein the thickness of at least a part of the leaning portion is thicker than a thickness of the cylindrical portion of the second cylindrical portion.

3. The hose with the metal fitting according to claim 1, wherein the material of the sleeve and the material of the outer-surface resin layer are thermoplastic polyurethane.

* * * * *